United States Patent [19]

Kahkipuro

[11] Patent Number: 4,684,856
[45] Date of Patent: Aug. 4, 1987

[54] METHOD AND DRIVE FOR ELEVATOR DC DRIVE MOTOR STABILIZATION

[75] Inventor: Matti Kahkipuro, Hyvinkaa, Finland

[73] Assignee: Elevator GmbH, Baar, Switzerland

[21] Appl. No.: 637,870

[22] Filed: Aug. 6, 1984

[30] Foreign Application Priority Data

Aug. 17, 1983 [FI] Finland .................................. 832946

[51] Int. Cl.$^4$ .......................... H02P 7/06; B66C 13/30
[52] U.S. Cl. .................................... 318/310; 318/327;
318/430; 187/120
[58] Field of Search ............... 187/29, 29 R; 318/301,
318/309, 311, 312, 314, 315, 317, 318, 326, 327,
341, 342, 345 A, 599, 615, 616, 621

[56] References Cited

U.S. PATENT DOCUMENTS

| | | | |
|---|---|---|---|
| 3,627,080 | 12/1971 | Takeo Yuminaka | 187/29 R |
| 3,694,720 | 9/1972 | Nakajima | 318/308 |
| 3,902,109 | 8/1975 | Speth et al. | 318/345 B X |
| 3,916,279 | 10/1975 | Kawano et al. | 318/430 |
| 3,983,464 | 9/1976 | Peterson | 318/327 |
| 4,027,745 | 6/1977 | Watanabe | 187/29 R |
| 4,072,212 | 2/1978 | Terazono et al. | 187/29 R |
| 4,161,236 | 7/1979 | Husson | 187/29 R |
| 4,263,988 | 4/1981 | Inaba et al. | 318/317 X |
| 4,366,422 | 12/1982 | Rhodes | 318/616 X |
| 4,432,439 | 2/1984 | Caputo et al. | 187/29 R |

FOREIGN PATENT DOCUMENTS 0054882 3/1983 Japan .................................. 318/317

Primary Examiner—William M. Shoop, Jr.
Assistant Examiner—Shik Luen Paul Ip
Attorney, Agent, or Firm—Martin Smolowitz

[57] ABSTRACT

A method and device for elevator DC drive motor speed control stabilization system in which current data and speed data are used as feed-back information. The current regulator is approximated by an ideal integrator, and mathematical model thereby obtained is used for determining the amplification and time constants of the control system speed loop or loops, and these system parameters are compensated by providing short instruction accentuations for achieving practically delay-free compliance with instructions.

1 Claim, 11 Drawing Figures

METHOD AND DRIVE FOR ELEVATOR DC DRIVE MOTOR STABILIZATION

BACKGROUND OF INVENTION

This invention is concerned with a method for elevator DC drive motor speed control stabilization, including a speed regulator in which speed and current data are used as feed-back information.

DC motors are popular as elevator drive motors because their speed is adjustable and they are vibration-free. However, due to complicated theory, it is extremely difficult to achieve a reliable speed control system for high-quality DC motors, resulting in speed deviations from the instructions provided by the speed regulator. Such deviations include too low an acceleration rate, temporary over-speed as well as speed fluctuations following the acceleration phase and when the elevator is being stopped at a floor.

In ordinary blocks of flats, conventional technology ensures adequate performance because the elevators are relatively slow. Speed control errors are, however, accentuated in high-speed elevators, which is the reason for the fairly poor performance of known elevators. If the elevator is fast, its passage is inconvenient and jerky; in order to achieve smooth travel, speed must be reduced.

This invention is designed to avoid the problems associated with the speed control of high-speed elevators. Characteristics of the method for elevator DC drive motor speed control stabilization is that the current regulator is approximated by means of an ideal integrator. The mathematical model thereby obtained is used for determining the time constants and amplification of the control system speed loop or loops, and these system parameters are compensated with corresponding short design speed accentuations to produce a practically delay-free control system. As a result, control signal generation is simplified because real speed follows closely the control voltage. In addition, accurate stopping is achieved, which, apart from being more convenient for the passengers, permits the use of a a narrower "stopping window" ensuring higher stopping accuracy.

By a stopping window we mean an area extending to the both sides of a floor level where the elevator can stop without requiring any rectification. Consequntly, the elevator cannot stop outside this window; if it tries to, it moves in creep motion until it finds the correct window.

SUMMARY OF INVENTION

It is characteristic of one of the applications of this invention that the ideal integrator is formed from the current regulator transmission function which is produced by means of the Laplace transformation in plane s using methods familiar from applied mathemtatics.

Furthermore, it is characteristic of one of the applications of this invention that the switching effecting design rating accentuations is designed on the basis of the transmission function of a known switching by means of the Laplace transformation by comparing switching parameters to those obtained from speed control approximations.

It is characteristic of a speed regulator based on this invention that the regulator embodies a circuit for accentuating the design value. Basically, this circuit is of the known operation/amplification type which includes phase compensation so that the output has a capacitative lead of phase as compared to input. The accentuation circuit comprises several accentuation circuits, the number of which corresponds to the number of the time constants of the speed control system to be compensated. As the input, or design value, changes, these circuits generate the accentuation signals whereby the elevator speed follows the control signals practically without any delay.

Moreover, it is characteristic of a regulator based on this invention that the design value accentuation circuit embodies two derivative accentuation circuits of equal size as well as one integrating accentuation circuit.

Characteristic of another regulator based on this invention is that it comprises a double-backed speed feedback system, and the design rating accentuation circuit embodies two derivative accentuation circuits.

The invention is explained in greater detail by means of examples and with reference to the enclosed drawings where

DESCRIPTION OF PREFERRED EMBODIMENTS OF THE INVENTION

Figure 1:
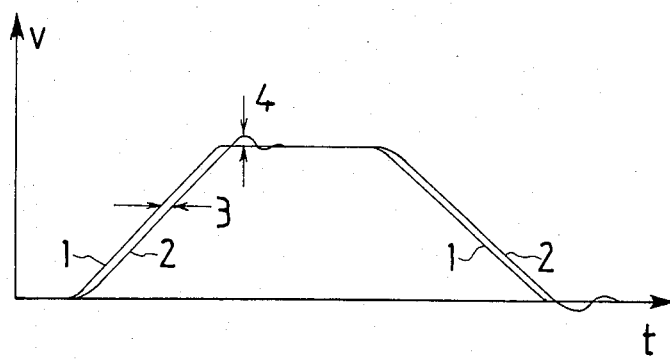
FIG. 1 presents curves for control system design speed and real real speed of an elevator using a conventional speed control system

In FIG. 1, the elevator speed curve (2) falls behind the control system curve (1) in the acceleration phase (rising edge), the difference being a constant (3). When the acceleration phase is over and the speed is to be stabilized, the control system fails recognize the change immediately. Instead, the real elevator speed fluctuates with diminishing amplitude around the correct value because of the specific inertia of the control system. The same situation is repeated when the elevator is stopped. During braking, the real speed curve (2) remains somewhat higher than the control system curve (1) and fluctuations occur.

Figure 2A:
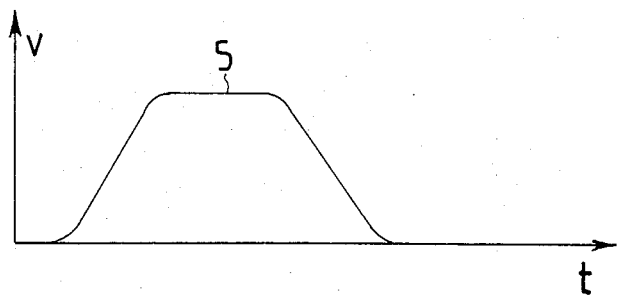
FIG. 2a presents an optimum drive curve
Figure 2B:
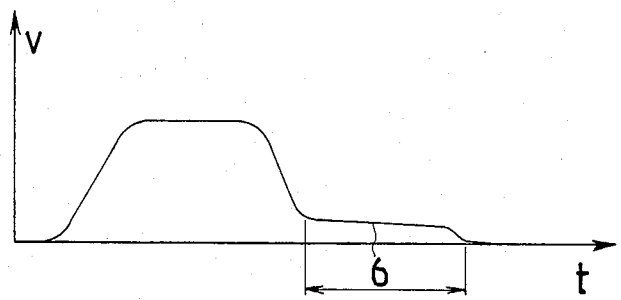
FIG. 2b presents the drive curve of an elevator equipped with a creep delay system FIG. 3 the block diagram of a conventional speed control system

FIG. 2a presents an optimum case of the situation described in FIG. 1. Speed drops to zero at the moment when the elevator finds the correct stopping point, so curves (1) and (2) merge into curve (5). FIG. 2b indicates the loss of time suffered if the optimum drive curve is not attained. The creep motion (6) means waste of time and problems with acceleration are not overcome, either.

Figure 3:
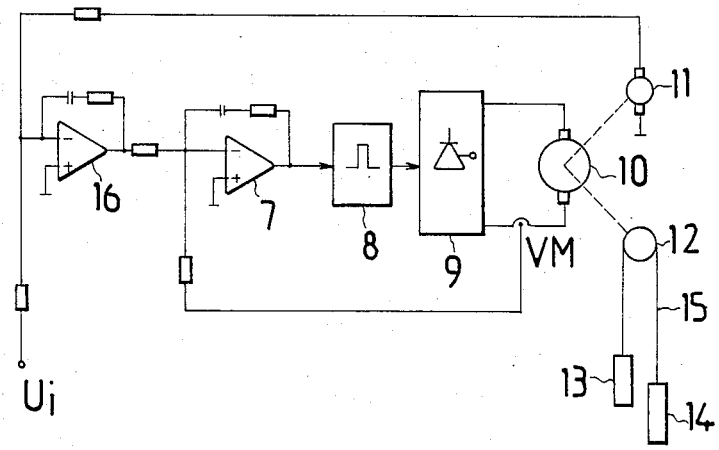

The conventional speed control system depicted in FIG. 3 presents the problem of how to construct an analytically correct system, current regulator (7), thyristor ignition circuit (8) and thyristor bride (9) in order to know exactly the state of the system at every moment, which is a pre-condition for meaningful modification of the specific values of the system. The speed control system (16) consists of the so called PI regulator (Proportional Integral) which is, as such, perfectly controlable. In addition, FIG. 3 depicts elevator machinery including the drive motor (10), tachometer (11), drive pulley (12), elevator car (13) and counterweight (14). Reference to these numbers is made below. VM means a transformer.

EXAMPLE 1

This example provides a method for stabilization calculations.

Figure 4:
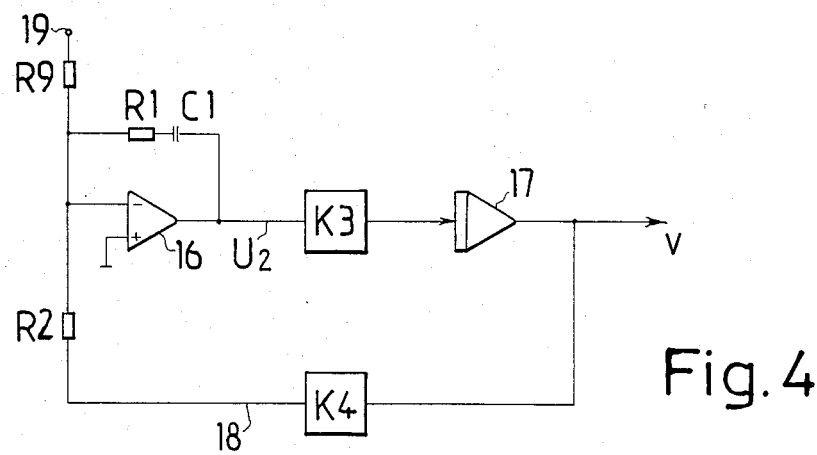
FIG. 4 presents a block diagram suitable for the analysis of a speed control system based on the invention

FIG. 4 presents a model for a speed control system based on this invention. A special feature in FIG. 4 is that the entire current regulator loop is approximated with integrator (17). This makes it possible to develop a simple model. Moreover, this kind of approximation is particularly accurate in elevators because the current regulator time constants are in the order of 10 ms whereas the speed loop time constants are in the order of 300 ms.

Let us determine the transmission function for FIG. 4. As known from the operative amplifier theory, the transmission function (=G1) of the regulator (16) is the following:

$$G1 = \frac{K1(1 + s^*T1)}{s} \quad (1)$$

In this equation, s is the Laplace transformation, K1 is the regulator connection amplification and T1 is regulator connection time constant.

In equation 1:

$$K1 = 1/(R2^*C1) \quad (2)$$

$$T1 = R1^*C1 \quad (3)$$

R1, R2 and C1 are regulator circuit components in accordance with FIG. 4.

In FIG. 4, the transmission function (G2) of the entire open loop without feed-back is as follows:

$$G2 = \frac{K2(1 + s^*T1)}{s^*s} \quad (4)$$

where $$K2 = K1K3 \quad (5)$$

According to the control system theory, the closed system transmission function (=G3) is obtained as follows:

$$G3 = G2/(1 + G2^*K4) \quad (6)$$

Equation (4) is placed into Equation (6). After cancellation, we obtain:

$$G3 = K2^*(1+s^*T1)/(s^*s + s^*K2^*K4^*T1 + K2^*K4) \quad (7)$$

Let us examine the zero points of Equation (7):

$$s^*s + s^*K2^*K4^*T1 + K2^*K4 = 0 \quad (8)$$

The roots are:

$$s1,s2 = (K2^*K4^*T1)/2 + (-)SQR(A) \quad (9)$$

where $$A = (K2^*K2^*K4^*K4^*T1^*T1)/4 - K2^*K4 \quad (10)$$

According to the control system theory, no quadratic term will be generated in the system, if amplification K is sufficiently low so that Equation (10) equals zero. This is a necessary precondition for elimination of transits. We obtain the so called critical amplification:

Following cancellation, we obtain:

$$K2^*K4^*T1^*T1 = 4 \quad (11)$$

When taking into account Equation (5), we obtain:

$$K1^*K3^*K4^*T1^*T1 = 4 \quad (12)$$

On the basis of what is presented above, constants K1 and T1 are determined by control system components R1, R2 and C. Components K3 and K4 are determined by the elevator drive motor and flywheel characteristics. These can be calculated fairly easily but below we will determine these constants by means of simple measurements.

Figure 6:
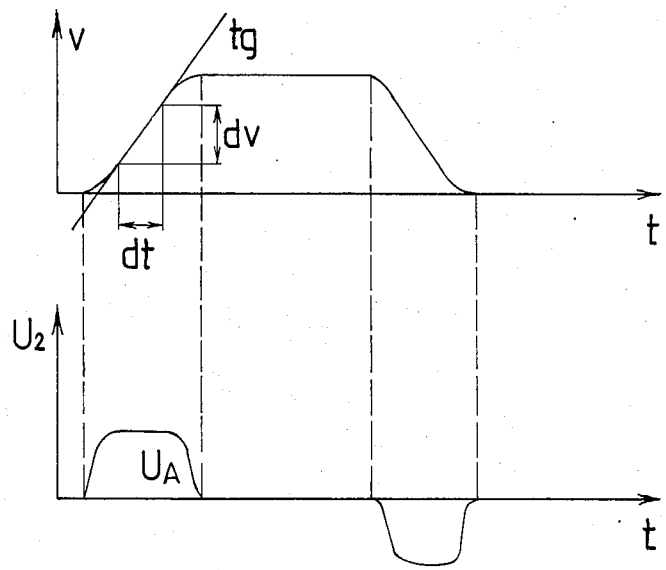
FIG. 6 presents the speed curve of an elevator used as an example as well as the regulator output voltage

By measuring voltage U2 in FIGS. 4 and 6 with the acceleration rate a, we obtain voltage Ua. As K3 is the ratio of voltage and acceleration rate, it follows:

$$K3 = a/UA \quad (13)$$

Let us examine constant K4. When the elevator speed is nominally V, the tachometer output voltage (18) in FIG. 4 is Ub. This yields:

$$K4 = Ub/Vn \quad (14)$$

When Equations (13), (14), (2) and (3) are placed into Equation (12), we obtain after cancellation:

$$C1 = (4^*R2Ua^*Vn)/(Ub^*R1^*R1^*a) \quad (15)$$

Equation (15) yields a rule according to which the control system capacitance is determined when other system constants are known. When a solution conforming to Equation (15) is used, the denominator of the closed control system transmission function will include two equal time constants because amplification is tuned critical.

The denominator time constant is obtained from Equation (9). As amplification is so great that the square root term equals zero, the inverse value of the first part of the equation gives the required time constant. This time constant shall be called T2. We obtain:

$$T2 = 2/(K2^*K4^*T1) \quad (16)$$

If Equations (5), (2), (3), (13) and (14) are placed in Equation (16), we obtain:

$$T2 = (2^*R2^*Ua^*Vn)/(a^*R1^*Ub) \quad (17)$$

On the basis of Equation (7), the final closed-loop transmission function of a control system using critical amplification is obtained as follows:

$$G4 = K5(1+s^*T1)/(1+s^*T2)(1+S^*T2)) \quad (18)$$

K5 is closed system amplification, and its value does not affect system dimensioning now under consideration, for which reason it is not dealt with in greater detail. The time constants of this transmission function are obtained from Equations (3) and (17).

Next we will show how the transmission function obtained from Equation (18) can be made to follow control system instructions without delay and transit by accentuating the instructions appropriately.

Figure 5:
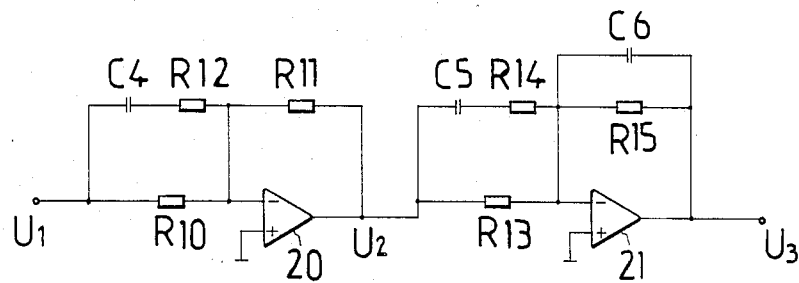
FIG. 5 presents the speed control signal accentuation circuit

Let us examine the accentuation circuit presented in FIG. 5. The accentuation circuit is used so that the speed control voltage (19) passing from operative amplifier (21) into FIG. 4 is first routed via the accentuation circuit depicted in FIG. 5.

Using the operative amplifier theory, the transmission function of the circuit in FIG. 5 is obtained as follows:

$$G5 = ((1+s^*T4))/(1+s^*T5) \quad (19)$$

where $$T3 = R10^*C4 \quad (20)$$

$$T4 = R13^*C5 \quad (21)$$

$$T5 = R15^*C6 \quad (22)$$

The foregoing transmission functions and time constants are valid, if resistor R12 is sufficiently weak as compared to R10. This serves as basis for dimensioning. Resistor R12 is needed only to maintain the internal stability of operative amplifier (20). Similarly, R14 must be weak in comparison to R13. Furthermore, R10 must be equal to R11 and R15 equal to R13. These equals determine the transmission function (19) amplification term as one.

The time constants of the accentuation circuit must be selected so that:

$$T3 = T4 = T2 \text{ and } T5 = T1 \quad (23)$$

On the basis of the above it is stated that the time constants of Equation (19) cancel out those of Equation (18). In this way, good ability to follow instructions as suggested by this invention is achieved.

Let us take a numeric example to illustrate how stabilization is accomplished. FIG. 6 presents the measured speed curve and speed control system output voltage U2 of an elevator to be stabilized. For the measurement, the elevator must be operating with 50% load. Tangent tg is drawn to the measured speed curve. With the tangent, it is possible to determine the acceleration rate of the elevator. Let us assume that the measured dv=2 m/s and dt=2 sec. Now we can calculate the acceleration rate which is 1 m/s*s. Furthermore, the measured Ua=5 V and Ub=20 V while the nominal speed of the elevator is 4 m/s. Resistors R2 and R1 in FIG. 4 depicting the control system are selected experimentally so that the elevator travels smoothly. Amplification, however, must be as great as possible. If, for example, R2 is 100k ohm, R1 shall be as strong as possible. Measurements and experiments shall be made using a non-optimum control system because the optimum system is not yet known at this stage. Assuming that the value of R1 is 500k ohm, we can now calculate capacitor C1 using Equation (15), obtaining:

$$C1 = (4^*100k^*5 \text{ V}^*4)/(20 \text{ V}^*500k^*500k) = 1.6 \text{ microf}.$$

Next, we determine the time constants of FIG. 5 accentuation circuit. Resistors R10, R11, R13 and R15 in the accentuation circuit are initially equal in size, for example 100k ohm. After this, T1 is calculated using Equation (3):

$$T1 = 1.6E - 6^*500E3 = 0.8 \text{ sec}$$

This yields a capacitor C6 value of 8 microf. Now time constant T2 is determined using Equation (17):

$$T2 = (2^*100k^*5 \text{ V}^*4)/(1^*500k^*20 \text{ V}) = 400 \text{ msec}$$

From this we obtain C4=0.4 microf. and C5=0.4 microf.

Thus we have accomplished a control system based on the invention. It should be pointed out that it is advisable to dimension the current regulator so that no transits occur even when using strong current.

Figure 7:
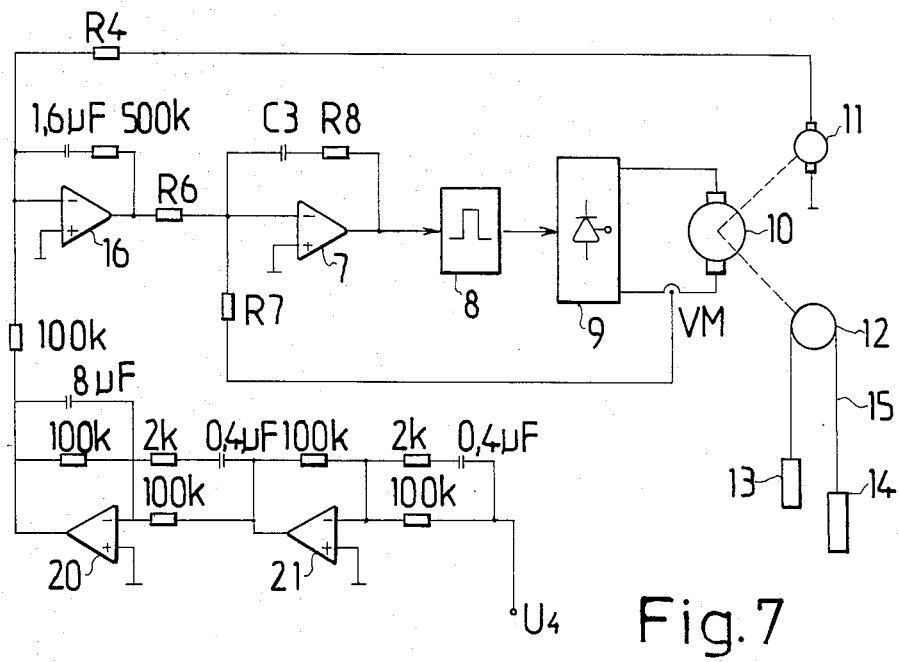
FIG. 7 presents an example of the control system based on the invention

FIG. 7 presents a dimensioning conforming to the example given above. It should be noted that the value of resistors R12 and R14 in FIG. 5 is given as 2k ohm, which is in accordance with the principle of dimensioning presented above. Dimensioning for components R6, R7, R8, R4 and C3 in FIG. 7 was not specified because by now it is obvious to a professional how to determine their value; also, it falls outside the scope of this invention. The elevator speed control voltage U4 was likewise determined using a known method.

EXAMPLE 2

Figure 8:
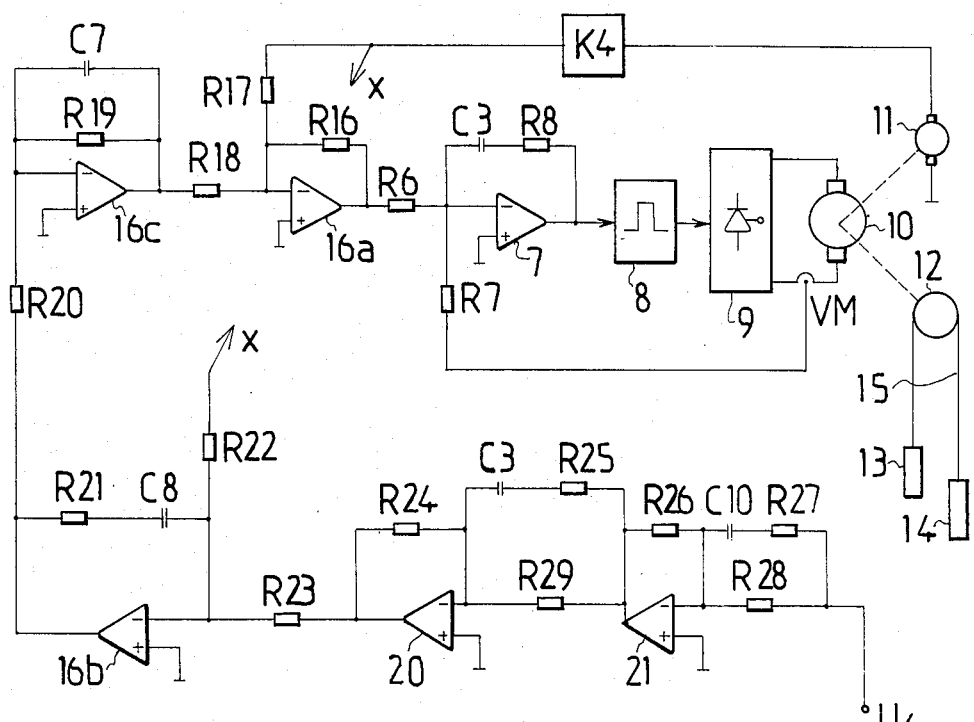
FIG. 8 presents another application of the invention

Let us take another example of an application of this invention. It is presented in FIG. 8. FIG. 8 differs from FIG. 7 in that the tachometer feed-back connection is doubled via resistors R17 and R22. Due to doubled feed-back connection, the accentuation capacitor C6 depicted in FIG. 5 is rendered unnecessary. This fact is proved below. It is advantageous in the sense that the time constant determined by C6 is great therefore the stability of compensation to capacitor tolerance and temperature dependence is poor. Consequently, the solution presented in FIG. 8 is superior to that in FIG. 7.

To begin with, we will analyze the transmission function of the loop formed by the first speed feed-back connection presented in FIG. 8.

Without taking into account the feed-back connection, the transmission function of an open loop (=G6) is as follows:

$$G6 = K6/s \quad (24)$$

where $$K6 = (K3^*R16)/R17 \quad (25)$$

Now we will determine the transmission function of a closed loop using the principle employed in Equation (6):

$$G7 = (K6/s)/(1+(K6^*K4)/s) \quad (26)$$

This equation can be cancelled as follows:

$$G7 = K7/(1+s^*T6) \quad (27)$$

where $$K7 = 1/K4 \quad (27a)$$

We see that as the regulator 16a in the inner speed control circuit is of the resistor feed-back type, the closed loop includes now only a time constant and no longer any integration term as in the case of FIG. 4. This facilitates dimensioning of the accentuation circuit as we shall see.

Let us now derive an equation for determining time constant T6. From Equations (27) and (26) we obtain:

$$T6 = 1/(K4*K6) \quad (28)$$

Taking into account Equations (25), (13) and (14), we obtain:

$$T6 = (Ua*Vn*R17)/(a*Ub*R16) \quad (29)$$

Here we have the desired equation for the time constant.

The outer speed control loop is stabilized as follows. The feed-back connection R21, C8 of regulator 16b is dimensioned so that the time constant R21*C8 formed by them is equal to T6. In this way, the two constants compensate each other. Now in the outer speed control loop remain the integration term of amplifier 16b and the time constant T7 formed by the feed-back connection of amplifier 16c:

$$T7 = C7*R19 \quad (29a)$$

Figure 9:
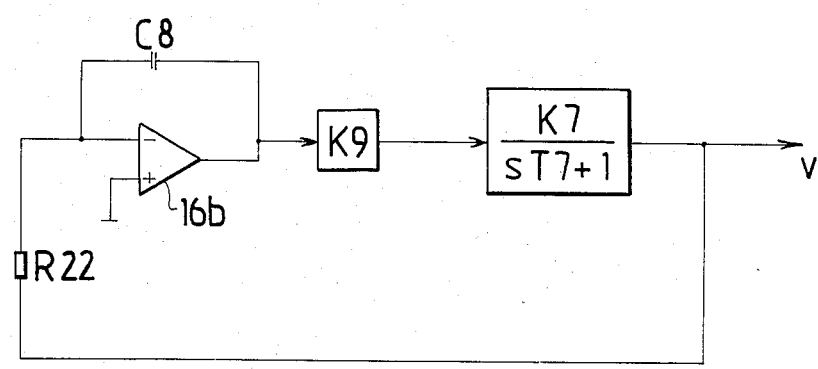
FIG. 9 presents an alternative switching of the regulator analysis outlined in Example 2

A situation conforming to FIG. 9 is achieved. Assuming that R20=R19, the amplification of amplifier 16c is one.

Next, the transmission function of the closed loop in FIG. 9 is determined.

$$K8 = K7*K9/(R22*C8) \quad (30)$$

where $$K9 = R17/R18 \quad (30a)$$

The open transmission function of the loop is:

$$G8 = K8/s*(1+s*T7) \quad (31)$$

This leads to the transmission function of closed loop:

$$G9 = G8/(1+G8*K4) \quad (32)$$

$$G9 = K8/(s*(1+s*T7)+K8*K4) \quad (33)$$

$$G9 = (K8/T7)/(s*s+s/T7+K8*K4/T7) \quad (34)$$

Let us examine the zero points of the denominator:

$$s1,2 = -1/(2*T7)+(-)SQR(1/(4*T7*T7)-K8*K4/T7) \quad (35)$$

The tuning is critical when the square root term equals zero:

$$\tfrac{1}{4}*T7*T7 - K8*K4/T7 = 0 \quad (36)$$

Or:

$$4*K8*T7*K4 = 1 \quad (37)$$

Equations (14), (27a), (29a), (30) and (30a) are placed into Equation (37) whereby we obtain:

$$C8 = 4*R19*C7*R17/(R22*R18) \quad (38)$$

When the capacitor C8 is calculated by means of Equation (38), we obtain an amplification which gives critical tuning.

For the final determination of the speed control loop, we need the transmission function of the closed loop in the case of critical amplification. This can be derived from Equation (34) when taking into account that two equal time constants are obtained in the denominator. It yields:

$$G10 = K10/((1+s*T8)*(1+s*T8)) \quad (39)$$

The time constant of Equation (39) can now be inferred from Equation (35):

$$T8 = 2*T7 \quad (40)$$

Now we have determined the value of capacitor C8 which achieves critical amplification as well as the transmission function of the final speed loop and its time constants. Next we will explain how to accomplish suitable accentuation of speed instruction in order to achieve delay-free compliance. FIG. 8 presents the correct compensation circuit constructed around amplifiers (20) and (21). In this case, compensation of two time constants is sufficient. The compensation is correct, when:

$$C9*R29 = C10*R28 = T8 \quad (41)$$

Now the theoretical analysis of Example 2 is completed.

Let us now provide a numerical solution to Example 2. We assume that the measured values for the elevator are the same as in the numerical solution to Example 1. Resistors R16 and R17 can be selected fairly freely. Assuming that R16=300k and R17=100k, we obtain the time constant of the first loop from Equation (29):

$$T6 = (5\ V*4\ m/s*100k)/(1\ m/(s*s)*20\ V*300k) = 0.33\ \text{sec}$$

Further more, R18=R19=R20=100 kohm. These resistors can be selected freely. Capacitor C7 is determined great enough so that the mechanical resonance of the elevator does not cause vibrations.

This value is determined experimentally. C7=1,0 microf. Equation (29a) yields:

$$T7 = 1,0\ \text{microf.}*100\ \text{kohm} = 100\ \text{msec}$$

Using Equation (40), the time constant of the speed loop is :

$$T8 = 200\ \text{msec}$$

The compensation circuit resistors shall be R24=R29=R26=R28=100 kohm. Thus, on the basis of Equation (41), the values of capacitors C9 and C10 is 1 microf. Next we determine the value of capacitor C8. Before this, R22 can be selected freely. We assume that R22=100 kohm. This is done on the basis of Equation (38):

$$C8 = 4*100\ k*1\ \text{microf}*100\ k/(100\ k*100\ k) = 4{,}0\ \text{microf}$$

When C8 is obtained, R21 must be selected so that T6=C8*R21. This yields:

$$R21 < T/C8 = 0{,}33\ \text{sec}/4{,}0\ \text{microf} = 82\ \text{kphm}$$

Now the desired dimensioning is completed.

Figure 10:
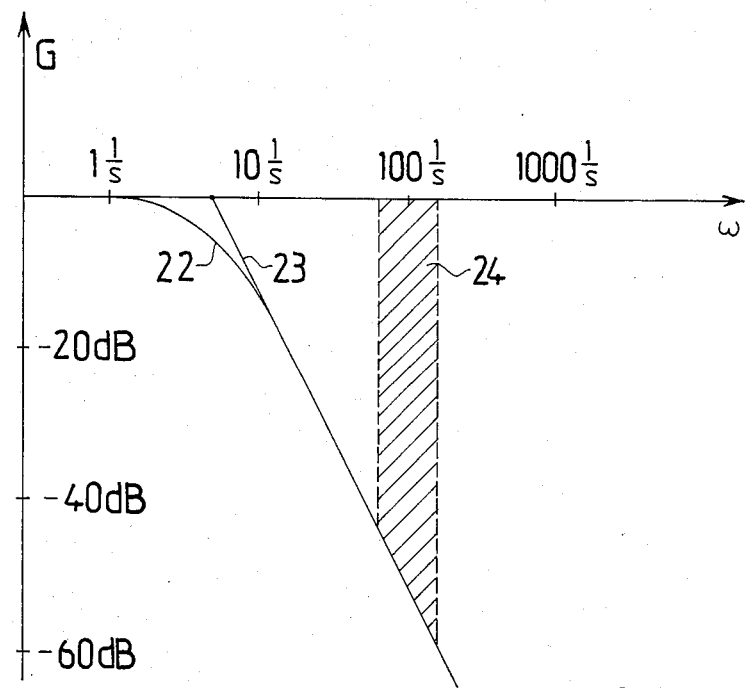
FIG. 10 presents the amplitude curve of the Bode diagram of a closed speed loop transmission function of Example 2

Let us examine one detail of the invention using FIG. 10 which presents the transmission function Bode diagram amplitude curve (22) and its asymptotic representation in accordance with Example 2. In addition, FIG. 10 presents the typical area of mechanical resonance of a phase-free elevator, providing the following transmission function:

$$G11 = 1/((1+s*0{,}2)(1+s*0.2)) \qquad (42)$$

FIG. 10 indicates that the final transmission function of the control system must be so tuned as to ensure adequate damping for the mechanical resonance area. It is in the order of 40 dB.

It is obvious to a professional that the various applications of the invention are not confined to these examples but they can vary within the framework of the patent claims presented below.

I claim:

1. An elevator speed control stablization system for a DC motor in which speed control current signal and speed signal are used as feedback information, said system comprises:

a first and second stablization circuit in circuit relation with respect to one another being in series in a control signal circuit for compensation of three time constants in a speed control loop, practically delay free compliance with respect to speed control signals;

said control signal originating at the input to said first stabilization circuit and said second speed control signal originating at the input to said second stablization circuit;

said stablization circuit having phase compensation, so that the output of said stablization circuit has a capacitive lead of phase as compared to the input of said stablization circuit; each of said stabilization circuits have operational amplifiers and said first stabilization circuit being able to compensate one time constant, said time constant being a parallel coupling network of resistance and capacitance in circuit with said operational amplifiers;

and said second stablization circuit being able to compensate two time constants with the aid of a stabilization circuit, said time constants being a series coupling of resistance and capacitance in circuit with said operational amplifiers; and a portion of the speed control signal is fed to the output of said second stabilization circuit and the output signal of said second stabilization circuit is fed to an additional operational amplifier as the output of said second stabilization circuit, to isolate the stabilization circuits from an ignition circuit firing motor drive thyristors of said DC drive motor.

* * * * *